United States Patent [19]

Rasmussen et al.

[11] 4,125,826
[45] Nov. 14, 1978

[54] ULTRASONIC VEHICLE ALARM SYSTEM

[76] Inventors: Fred M. Rasmussen, 1432 Thunderbird, Sunnyvale, Calif. 94087; John S. Dour, 1155 Danbury, San Jose, Calif. 95129

[21] Appl. No.: 756,902

[22] Filed: Jan. 5, 1977

[51] Int. Cl.$^2$ ............................................. B60R 25/10
[52] U.S. Cl. ...................................... 340/63; 340/531; 340/558; 307/10 AT
[58] Field of Search ............... 340/63, 64, 224, 258 R, 340/258 A, 258 C, 258 B, 276, 280, 416; 307/10 AT; 325/111, 117; 343/225, 228

[56] References Cited

U.S. PATENT DOCUMENTS

| 3,112,486 | 11/1963 | Alder | 343/225 |
|---|---|---|---|
| 3,157,871 | 11/1964 | Umanoff | 340/280 |
| 3,192,507 | 6/1965 | Sudges | 340/171 R |
| 3,605,082 | 9/1971 | Matthews | 340/258 |
| 3,703,714 | 11/1972 | Andrews | 340/224 |
| 3,914,753 | 10/1975 | Cho | 340/511 |
| 3,988,724 | 10/1976 | Anderson | 340/280 X |

Primary Examiner—Alvin H. Waring
Attorney, Agent, or Firm—Limbach, Limbach & Sutton

[57] ABSTRACT

An alarm system utilizing a vehicle transmitter of pulsed ultrasonic energy directed to a stationary receiver outside the vehicle and which renders an alarm if the receiver does not receive ultrasonic energy of a given frequency for a preset time period. The vehicle transmitter is disabled in response to an intruder alarm in the vehicle detecting the presence of an intruder. The receiver alarm thus is activated either by the presence of an intruder or by the vehicle being moved a sufficient distance from the receiver.

9 Claims, 4 Drawing Figures

ULTRASONIC VEHICLE ALARM SYSTEM

BACKGROUND OF THE INVENTION

This invention relates generally to alarm systems, and more specifically to ultrasonic vehicle alarm systems.

Most of the existing alarm signaling systems utilize either wire connections throughout and/or complex signal encoding techniques in connecting various intrusion detection zones to a remote alarm location. These systems are not economically adaptable to monitoring vehicles since the intrusion zone to be monitored is movable with respect to a central alarm location.

Accordingly, it is a principal object of the present invention to provide a wireless intrusion alarm system that is uni-directional enough to communicate between the vehicle and the central alarm system over a range of vehicle positions.

It is another object of the present invention to provide an intrusion alarm system that is not triggered by spurious signals and which also is resistant to jamming.

It is yet another object of the present invention to provide a vehicle alarm system that is simple, economical and which has a low power requirement permitting continuous operation.

It is another object of the present invention to provide a vehicle alarm system that has the capability of both detecting an intruder into the vehicle and vehicle movement away from a prescribed location.

SUMMARY OF THE INVENTION

These and additional objects are accomplished by the vehicle alarm system of the present invention wherein, briefly, the vehicle is provided with a transmitter of periodic bursts of compressional wave energy of a single frequency within the ultrasonic range. This transmitted signal is directed to a stationary receiver at all times that the vehicle is being monitored. The receiver examines the received ultrasonic signal for three characteristics: (1) to verify that its frequency is the same as the single frequency of the ultrasonic transmitter; (2) that each separate burst of energy lasts for at least a specified time period that is a portion of the known duration of each transmitter burst; and (3) that no more than a set consecutive number (such as two) of such "qualified" bursts are missing. The receiver is insensitive to any amplitude variations of the signal and requires no other signal or mechanism to satisfactorily operate. So long as such an ultrasonic signal continues to be received, an alarm is kept in a disabled state. But when the signal is broken, such as by the vehicle being removed from the area in which it is normally kept, the alarm is sounded. The vehicle transmitter is also desirably provided with an intruder detecting system that disables the transmitter signal upon an intruder first entering the vehicle so that an early alarm is sounded even before the vehicle is removed from the area.

Use of ultrasonic energy as the communicating medium from the vehicle permits a certain amount of movement of the vehicle without sounding the alarm since ultrasonic energy is not as directional as other forms of radiation such as laser light beams, microwave beams, and so forth. But undesired noise of ultrasonic energy is more of a problem than with other radiation forms since ultrasound is so easily generated, such as by the wind, the running of an engine, etc. The characteristics of the receiver in selecting received signals only if they meet all of the three above described criteria gives an assurance that the alarm is disabled only when the vehicle transmitter signal is received and not as a result of some such spurious ultrasonic radiation in the area. The possibility of intentional jamming of the system by an intruder is minimized as a result of the system being responsive to only a narrow frequency range of ultrasound.

Additional objects, advantages and features of the present invention are included in the following description of its preferred embodiment, which should be taken in conjunction with the accompanying drawings.

DESCRIPTION OF A PREFERRED EMBODIMENT

Figure 1:
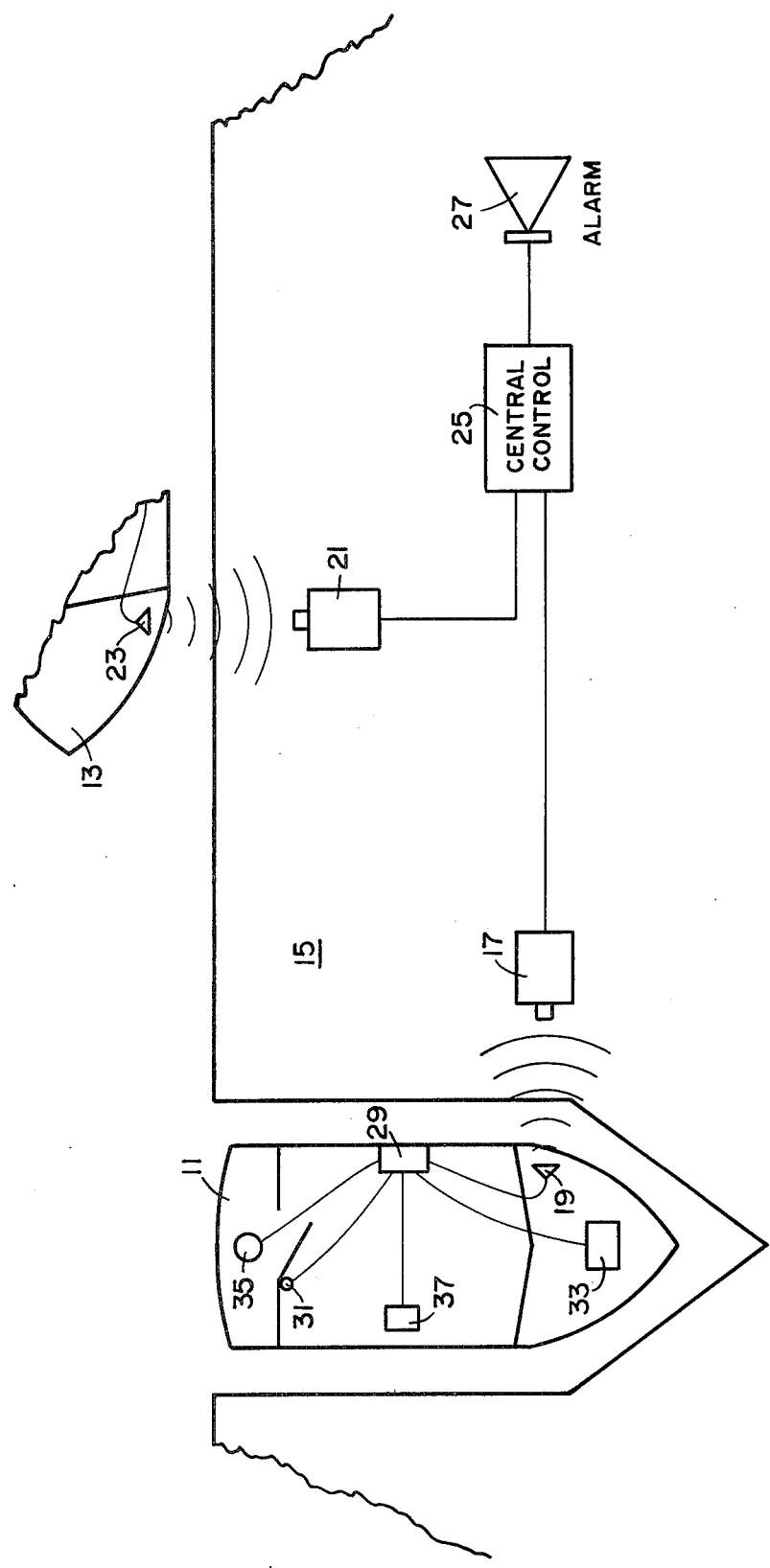
FIG. 1 schematically illustrates a vehicle alarm system utilizing the various aspects of the present invention as installed in a boat harbor wherein the protected vehicles are unattended pleasure boats.

Referring to FIG. 1, a particular application of the vehicle alarm system of the present invention is shown wherein unattended pleasure boats 11 and 13, among perhaps many dozens of others, are supervised by the alarm system of the present invention. Provided on a dock area 15 is an ultrasonic receiver 17 disposed to normally receive ultrasonic energy from a transmitting transducer 19 on one of the boats 11. The receiver 17 is positioned so that it will receive the signal from the transducer 19 when the boat 11 is somewhere within or near its predetermined docking position. Similarly, a second receiver 21 is provided in the dock area 15 for receiving ultrasonic energy from a transducer 23 on the second boat 13 when that boat is in or near its normal docked position.

Each of the fixed receivers 17 and 21 are electrically connected by wires to a central control unit 25 which provides a signal to initiate an alarm 27 when the ultrasonic energy normally received by one of the receivers 17 and 21 ceases to be detected. The alarm could then be a loud audible alarm at the location of the unattended boats, can be remotely connected to some supervising position to provide an audible alarm or a visible one, or can even be connected to a telephone system through an automatic dialer so that a remote supervisor, or perhaps even the boat owner, will be silently notified of the tampering with or removal of a boat. The central control 25 and alarm 27 preferably indicate which of the many boats that may be monitored by it is being removed or tampered with.

Referring to the schematic diagram of the boat 11 of FIG. 1, an electronic transmitter unit 29 is provided for driving the ultrasonic transducer 19. The transmitter 29 is powered by a battery source and thus it is advantageous to operate at as low a dufy cycle as possible in order to conserve power. Therefore, the ultrasonic energy transmitted by the transducer 19 is in periodic bursts of ultrasonic energy rather than being continuous.

In addition to detecting when the boat 11 is removed from its location, the alarm system may additionally be provided with a means for determining when an intruder has first entered the boat by equipping it with standard intruder detectors and connecting them to the transmitter 29 in a manner that the ultrasonic signal is disabled as soon as an intruder is so detected. For example, an intruder detector 31 may be provided on a door of the boat 11 to detect when that door is opened. Similarly, another intruder detector 33 could be provided on the forward hatch of the boat 11 to detect when that hatch is opened. Alternatively, or in combination with the detectors 31 and 33, a pressure sensitive detector 35 can be provided under a mat or the like in a position in the boat where an intruder is likely to first step. Also, an area intruder alarm 37 of the available type can be provided to detect by any one of numerous techniques the very presence of an intruder in the cabin of the boat.

Figure 2:
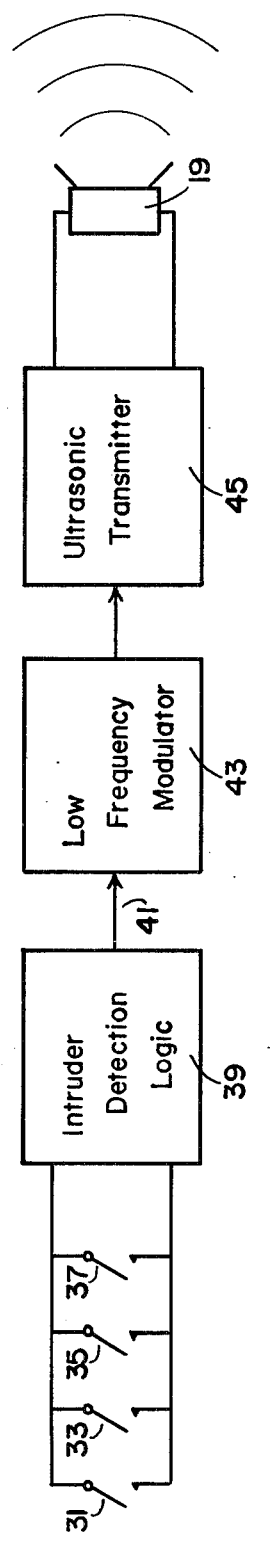
FIG. 2 illustrates in block diagram form a transmitter of ultrasonic energy for inclusion within a vehicle to be protected.

Referring to FIG. 2, the transmitter unit 29 is illustrated in block diagram form. Appropriate logic circuits 39 are connected to each of the intruder detectors 31, 33, 35 and 37 in a manner to emit an output signal in a circuit 41 when any of the intruder alarms is enabled by an intruder being present. The signal in the circuit 41 is connected to a low frequency modulator circuit 43 in a manner to disable the modulator when an intruder is so detected. The modulator 43 drives a single frequency ultrasonic energy power transmitter 45 that is connected to the transducer 19 for emitting the ultrasonic energy to its associated receiver.

The modulator 43, in effect, turns the transmitter 45 on and off to generate the desired output signal of periodic bursts of ultrasonic energy having a short duration (denoted as "N") and with a long rest period (denoted as "M") between energy bursts. The ultrasonic energy frequency can be selected to be 40,000 Hz., with N equaling about two seconds and M equaling about b 30 seconds. The ultrasonic energy output during each pulse of N seconds duration is maintained at a single frequency. There is no frequency or amplitude modulation necessary for the signal. Nor is any auxiliary signal, such as an additional electromagnetic energy signal, necessary in order for the associated receiver to determine that it is receiving the genuine signal from the transducer 19.

Figure 3:
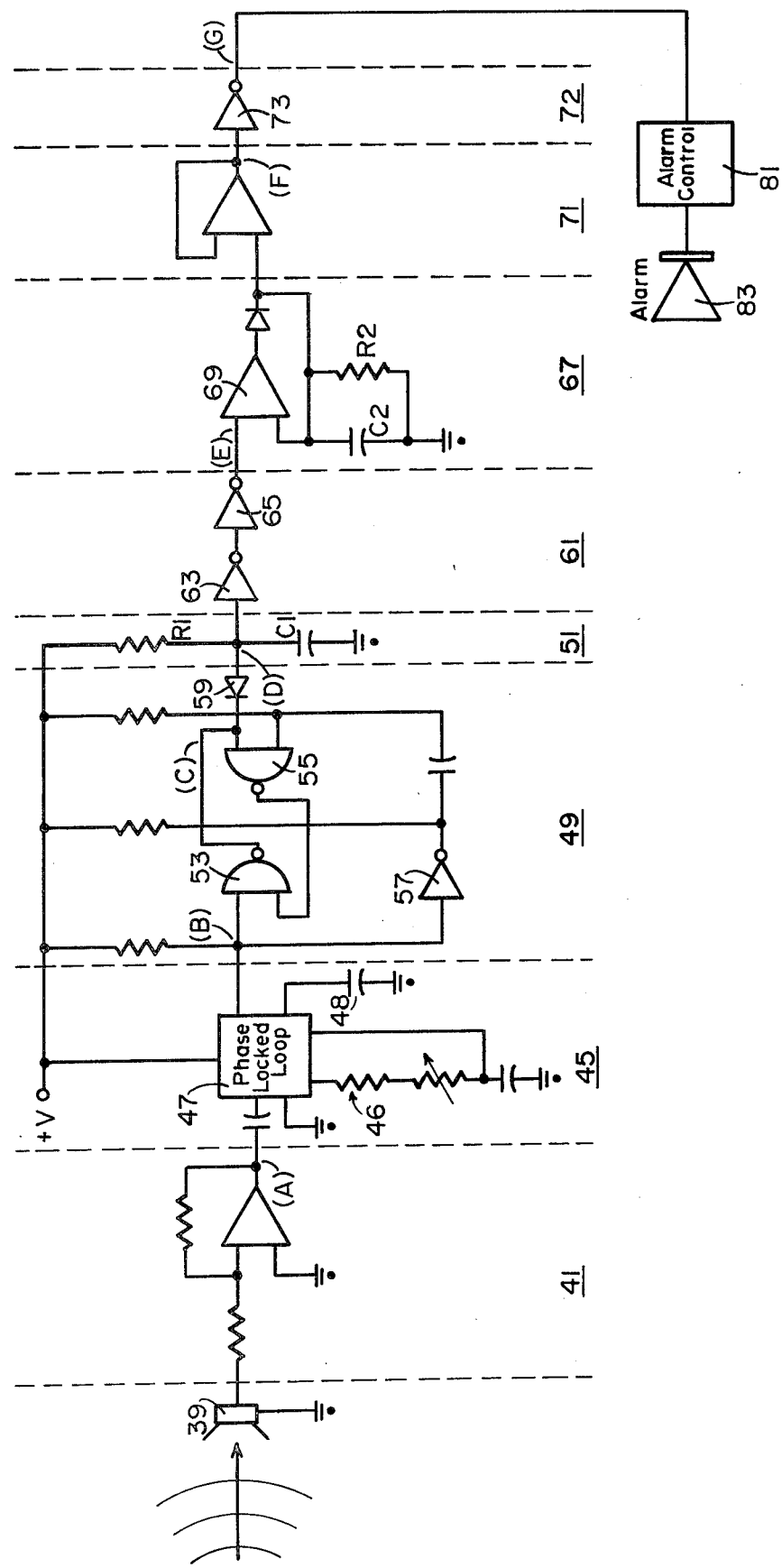
FIG. 3 is a schematic diagram of a stationary ultrasonic energy receiver that is utilized in conjunction with the transmitter of FIG. 2.

Referring to FIG. 3, a schematic diagram of a receiver, such as the receiver 17 of FIG. 1, is shown. A receiving transducer 39 is electrically connected to a standard preamplifier circuit 41. The signal output of the preamplifier 41 at point (A) is shown in FIG. 4(A). For the purposes of explaining the operation of the receiver of FIG. 3, the waveform of FIG. 4(A) has been shown to include several possibilities that will occur in normal operation of the intruder alarm system. Referring to FIG. 4(A), a burst of ultrasonic energy received from the transmitter is shown between the times $t0$ and $t4$, which is the duration N of the transmitted burst. To illustrate the effect of spurious ultrasonic noise from other sources at about the same frequency of the transmitter, the noise 43 of FIG. 4(A) is shown to exist in the interval M between successive transmitted bursts. A second burst from the transmitter exists between times $t9$ and $t12$ and, for the purposes of illustration, a transmitter burst that would normally occur between the times $t15$ and $t16$ is shown to be missed by the receiver. The next transmitted burst between the times $t17$ and $t18$ is shown to be received by the transducer 39. In a subsequent period of time between $t18$ and $t20$, which is in excess of twice the interval M between transmitted pulses, the transducer 39 of the receiver is shown to have received no pulse of ultrasonic energy from the transmitter, a condition that would occur if an intruder is present or if the vehicle is moved from its normal location. As is explained more fully hereinafter, the missing of one qualified burst between the times $t15$ and $t16$ by the receiver does not set off the alarm but the missing of two or more successive bursts in the time period $t18$ to $t20$ does cause the alarm to be activated.

Referring again to FIG. 3, the output of the preamplifier 41 is applied to a frequency discriminator circuit 45. The circuit 45 preferably is made up of a series-coupling capacitor and a phase locked loop circuit 47. Such a circuit is commercially available in a form known as a No. 567 Tone Decoder. An output of the frequency discriminator 45 at point (B) is shown in FIG. 4(B). The phase locked loop 47 operates in a manner that its output signal at point (B) rapidly changes level when it detects an input frequency within about plus or minus 5 percent of its specified frequency. Therefore, the phase locked loop 47 is chosen to have the same specified frequency as that of the ultrasonic transmitter with which the receiver is adapted to operate. External circuits 46 set the center frequency of the signal to which the phase locked loop 47 is to respond by turning its internal oscillator. Therefore, if the transmitter is set to operate at 40,000 Hz then the phase locked loop 47 is set to respond to that frequency as a center frequency. The value of an external capacitor 48 establishes the bandwidth of the phase locked loop 47, which could be set, for example, to be plus or minus 2,000 Hz. of the center frequency. Therefore, any ultrasound striking the transducer 39 outside of that frequency "window" to which the phase locked loop 47 responds is ignored and does not affect the receiver. Referring to FIG. 4(B), on the other hand, receipt of an expected transmitted burst within the "window" between times $t0$ and $t4$ is reflected at the output point (B) of the phase locked loop 47 by a negative going pulse between the times $t1$ and $t5$. A short response time of operation in the phase locked loop 47 causes its output to trail slightly behind receipt of the input burst.

The frequency discriminator output at point (B) is applied to a capacitor control switch 49 in the form of a solid state switching circuit. An output of the circuit 49 at point (C) thereof is shown in FIG. 4(C). The predominate function of the circuit 49 is to invert the output of the phase locked loop 47 at point (B) and also to provide a control of the charging of a subsequent capacitor C1 which is part of an integrating circuit 51. The switching circuit 49 is in the form of a flip-flop circuit and includes two NAND gates 53 and 55. An inverter 57 resets the flip-flop circuit in response to the phase locked loop 47 returning to its high level output that occurs when no signal within the narrow frequency "window" is being detected by it.

Figure 4:
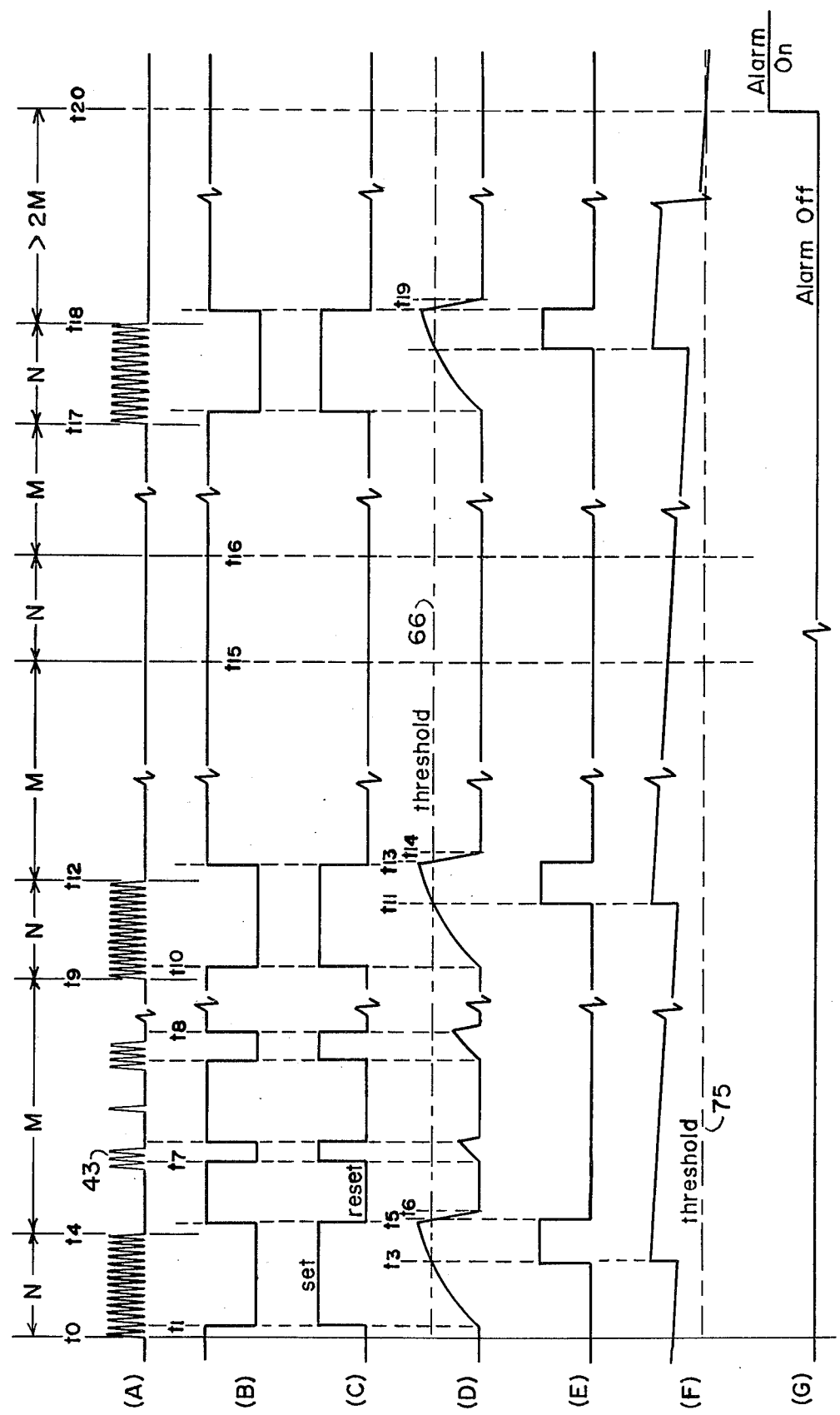
FIG. 4 is a timing diagram of the receiver of FIG. 3 showing waveforms at various locations therein.

The point (C) of the circuit 49 is connected through a diode 59 to one side of a capacitor C1 which is also designated as point (D). The voltage waveform for the example being described herein at point (D) is shown in FIG. 4(D). The opposite side of the capacitor C1 is connected to ground. The capacitor C1 is also connected through point (D) and a series resistance R1 to a positive voltage supply source +V. The capacitance C1 is normally being charged at a rate determined by the time constant of the resistance R1 and the value of the capacitance C1. Referring to FIG. 4, it can be seen that the capacitance C1 is effectively shorted out by the switching circuit 49 when in its reset state, such as that occurring between the time periods t6 and t7 when no ultrasonic signal of the prescribed frequency is being received by the transducer 39. But when such a signal is received and the output point (B) of the phase locked loop 47 is driven low as a result, the capacitance C1 is permitted to be charged through the resistance R1 from the +V voltage supply source. But when the switching circuit 49 is reset, such as at time t5 of FIG. 4, the capacitance C1 is discharged and by the time t6 its voltage has been reduced again to substantially zero.

The voltage across the capacitor C1 is applied to a threshold detector 61 which includes two inverters 63 and 65 connected in tandum. The output voltage at point (E) of the threshold detector 61 is shown, for the specific example being described, by FIG. 4(E). The inverter 63 is chosen to have characteristics such that when its input voltage rises above a set threshold, such as the threshold voltage indicated by line 66 of FIG. 4(D), its output is driven low as a result of the inverter being saturated. The second inverter 65 merely serves as a function to reserve the polarity of the signal so that upon saturation of the inverter 63 the output of the comparator 61 at point (E) is a positive going pulse as shown in FIG. 4(E). The width of the output pulse at point (E) is equal to the time that the voltage across the capacitor C1 is in excess of the threshold voltage level 66 set by the characteristics of the inverter 63. Of course, more conventional comparator circuits could be substituted for that shown, if desired.

The output of the comparator 61 is applied to a sample and hold circuit 67 which has a principal characteristic of a second capacitor C2 connected between an output of an operational amplifier 69 and ground. A resistance R2 is provided across the capacitance C2 to provide a continuous discharge path. The capacitance C2 is charged during the duration of the output pulses shown in FIG. 4(E) that come from the comparator 61 but at all other times is discharged through the resistance R2. The values of the capacitance C2 and resistance R2 are chosen so that the time constant is very long so that the capacitance is discharged to a level which initiates the intruder alarm only when a number (at least two) of ultrasonic energy pulses have been missed.

The output of the sample and hold circuit 67 is applied to a buffer circuit 71 whose voltage output at point (F) is illustrated in FIG. 4(F). This voltage signal follows the voltage across the capacitance C2.

A second comparator 72 is provided in the form of another inverter 73 that has a sharp change in its output upon being saturated by an input. The output of the comparator 72 at point (G) is shown in FIG. 4(G) and is the desired alarm signal. When the comparator 72 is low, an alarm is maintained in an inactive state. But when the output of the comparator 72 goes high, as shown in FIG. 4(G), an alarm is activated.

The comparator circuit 72 is set to have an input voltage threshold level indicated at 75 on FIG. 4(F). As the capacitance C2 is constantly discharged at its slow rate through its associated resistor R2, the voltage level at point (F) goes down. However, so long as the ultrasonic pulses of N seconds time duration are received often enough, the charge of the capacitance C2 is replenished so that its voltage is held above the threshold level 75. It is preferred to adjust the ultrasonic pulse length N, the time duration between pulses M, the time constant of the integrating circuit 51, the threshold level 66, the time constant of the sample and hold circuit 67 and the threshold level 75 so that the capacitance C2 discharges to a point which drives the voltage at point (G) high when no qualified ultrasonic pulses have been received for a period of time slightly in excess of twice the duration M between pulses. That is what is shown in the timing diagram of FIG. 4.

The principal function of the integrator 51 is to discriminate between short, spurious radiation that may strike the transducer 39 and is within the frequency range accepted by the phase locked loop 47. What the integrating circuit 51 does is assure that only bursts in excess of some time period in length, such as the time period between t0 to t3 of FIG. 4, are counted and made to operate in the circuit. Referring to FIG. 4(A), spurious ultrasonic signals 43 are illustrated which are random and discontinuous at the frequency at which the system is operating. Such spurious signals could well be generated by adjacent boats running their motors, for instance, or can even be generated by simple acts of someone in the vicinity of the receiver rattling his or her boat or car keys. The sources of ultrasonic signals other than the transmitter of interest are numerous. But since continuous noise of the given frequency is usually short relative to the time constant of the integrating circuit 51, it can be seen from FIG. 4(D) that the capacitance C1 is not given enough time to charge above the threshold level 66 by such noise. Therefore, the bursts of ultrasonic energy 43 of FIG. 4(A) have not qualified for use in the alarm circuit of the receiver of FIG. 3.

It can be seen that if the integrator circuit 51 is omitted, as it could be done if less reliability was desired, the pulses of FIG. 4(C) would be applied directly to charge the capacitance C2 and those short pulses 43 would then contribute to the operation of the circuit. Thus, the time constant of the integrating circuit 51 and the level of the threshold voltage 66 are chosen, as shown in FIG. 4(D), so that ultrasonic bursts at the prescribed frequency will be qualified only if they are continuous for a period that is a significant portion of the burst length N.

The alarm signal at point (G) of FIG. 4 can be used in any number of ways previously described, including application to an alarm control circuit 81 and an alarm 83 provided as part of the receiver itself. Or, the functions 81 and 83 can be provided as part of a central unit servicing a number of receivers, as shown in FIG. 1.

Although a preferred embodiment of the present invention has been described in some detail, it will be understood that the invention is entitled to protection within the full scope of the appended claims.

We claim:

1. A vehicle alarm system, comprising:
 a transmitter adapted for installation in said vehicle, said transmitter characterized by periodically emitting given length bursts of ultrasonic energy of a given frequency,
 means adapted to be installed in a permanent location for receiving the ultrasonic energy from the transmitter and converting it into an electrical signal representative thereof,
 means responsive to the electrical signal output of the receiving means for examining whether its frequency is substantially equal to said given frequency,
 means responsive to the frequency examining means for determining whether a receiving means signal output burst of substantially said given frequency has a time duration in excess of a set time that is less than said given length of said bursts, and means responsive to said time duration determining means for developing an alarm signal when a given number of receiving means output signal bursts of substantially said given frequency in excess of said set time duration are not detected.

2. The vehicle alarm system as defined by claim 1 which additionally comprises an intruder detector adapted for installation on said vehicle, said vehicle detector being connectable to said ultrasonic signal transmitter in a manner to disable said transmitter upon sensing the presence of an intruder in said vehicle.

3. The vehicle alarm system as defined by claim 1 wherein a plurality of cooperating vehicle signal transmitters receiving means are provided with each of their said alarm signals being connected to a central control for communicating an alarm in response to any of said receivers detecting the lack of a qualifying burst.

4. The vehicle alarm system according to claim 1 wherein said vehicle comprises a floating boat, said ultrasonic signal transmitter is installed on said boat and said ultrasonic receiver is fixed to the surroundings in a docking area adjacent said boat.

5. The vehicle alarm system as defined by claim 1 wherein said frequency examining means comprises a phase locked loop.

6. The vehicle alarm system as defined by claim 1 wherein said time duration determing means comprises a capacitor connected to be normally charging and which is connected to said frequency examining means through a circuit characterized by discharging said capacitor substantially instantaneously when the frequency examining means receives an electrical signal substantially unequal to said given frequency, whereby said capacitance is permitted to charge in response to receiving the proper radiation signal.

7. The vehicle alarm system of claim 6 wherein said alarm signal developing means comprises a second capacitance which is connected to be charged during a time period that the voltage across said first capacitor exceeds a threshold amount, and further comprises a second threshold detector for emitting said alarm signal when the voltage across said second capacitance decreases to a preset low value, whereby said alarm signal is emitted when ultrasonic energy has not been received for over said preset time period.

8. In an ultrasonic alarm system which includes an ultrasonic transmitter characterized by periodically transmitting bursts of ultrasonic energy of a fixed frequency for a set length of time with set rest periods between said transmitting periods, an ultrasonic energy receiver comprising:

an ultrasonic energy receiving transducer having an electrical signal output, a phase locked loop receiving the electrical signal output of said transducer and emitting a first signal when the frequency of the signal applied to the phase locked loop is substantially equal to said given fixed frequency and emitting a second signal when the signal input frequency is substantially unequal to said fixed frequency, means receiving said phase locked loop output signal for switching an output to provide a conductive path in response to said second phase locked loop output signal and to provide a nonconductive path in response to said first phase locked loop output signal, a first capacitor connected across said switching means output and to a voltage source for constant charging, said first capacitor being discharged when said switching means receives said second phase locked loop output signal, means receiving the voltage across said first capacitor for emitting a comparison output signal when said voltage exceeds a threshold value, said threshold value being set so that said comparison means exceeds it for a portion of the set length of time of the bursts, means receiving the comparator output signal for charging a second capacitor during the time period that said first comparator means has a comparison output signal, a large time constant discharge path connected to said second capacitor, and means monitoring the voltage across said second capacitor for emitting an alarm signal when the voltage thereacross drops below a second threshold voltage level, said threshold level being set to be reached by said second capacitor when at least two bursts of ultrasonic energy have been missed by the receiver.

9. In an ultrasonic alarm system which includes an ultrasonic transmitter characterized by periodically transmitting bursts of ultrasonic energy of a fixed frequency for a set length of time with set rest periods between said transmitting periods, an ultrasonic energy receiver comprising:

an ultrasonic energy receiving transducer having an electrical signal output, frequency detector means receiving the electrical signal output of said transducer and emitting a first signal when the frequency of the signal applied thereto is substantially equal to said given fixed frequency and emitting a second signal when the frequency of the signal applied thereto is substantially unequal to said fixed frequency, means receiving said frequency detector output signal for switching an output to provide a conductive path in response to said second detector output signal and to provide a non-conductive path in response to said first detector output signal, a first capacitor connected across said switching means output and to a voltage source for constant charging, said first capacitor being discharged substantially immediately when said switching means received said second output signal, means receiving the voltage across said first capacitor for emitting a comparison output signal when said voltage exceeds a threshold value, said threshold value being set so that said comparison means exceeds it for a portion of said set length of time of the transmitter bursts, means receiving the comparator output signal for charging a second capacitor during the time period that said first comparator means has a comparison output signal, a large time constant discharge path connected to said second capacitor, and means monitoring the voltage across said second capacitor for emitting an alarm signal when the voltage thereacross drops below a second threshold voltage level, said threshold level being set to be reached by said second capacitor when at least two bursts of ultrasonic energy from the transmitter have been missed by the receiver.

* * * * *